Figure 1:
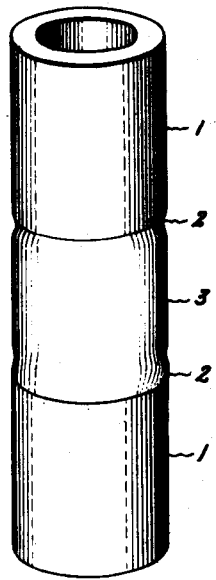

Feb. 16, 1937.  E. E. BURGER ET AL  2,071,196

GLASS-TO-METAL SEAL

Filed Jan. 4, 1934

Inventors
Emmett E. Burger,
Albert W. Hull,
by Harry E. Dunham
Their Attorney.

Patented Feb. 16, 1937

2,071,196

UNITED STATES PATENT OFFICE 2,071,196

GLASS-TO-METAL SEAL

Emmett E. Burger and Albert W. Hull, Schenectady, N. Y., assignors to General Electric Company, a corporation of New York Application January 4, 1934, Serial No. 705,250

8 Claims. (Cl. 49—81)

The present invention relates to glass-to-metal seals.

In the manufacture of electrical discharge apparatus, it is frequently necessary to make a seal between glass and metal. This seal provides a barrier between a certain gas or vapor pressure on one side and a condition on the opposite side in which there is either a greater gas or vapor pressure or a good vacuum. In the case of highly evacuated tubes, the pressure differential at the seal, for example, around the leading-in conductors, is of the order of one atmosphere which necessitates an exceedingly tight joint from the hermetic standpoint. In the case of gas or vapor tubes, the pressure which the seal is called upon to withstand is, of course, the difference between the atmospheric pressure on the one hand and the pressure of the gas or vapor within the tube on the other hand; this pressure difference may also be large.

As the result of extensive research, the art has developed several types of seals for joining together different kinds of glass and metal. These seals may be roughly divided into four general groups:

(1) The platinum or tungsten seal.
(2) Composite metal seal.
(3) Tapered edge seal.
(4) Chrome-iron seal.

The idea underlying the designs of most of these prior seals is to provide a metal which has substantially the same coefficient of expansion at room temperature as that of the particular glass to which it is joined. Many of the metals, such as platinum, tungsten, nickel-iron coated with copper (composite metal), chrome-iron, etc. have coefficients of expansion which compare favorably with that of glass of a predetermined composition at room temperature but in the case of the tapered edge seal, in which copper is ordinarily employed, there is a marked difference of expansion, even at room temperature. In the case of the copper seal, the problem of making a gas tight joint resolves itself into one of keeping the strain at the seal below the breaking strength of the glass. It will, of course, be understood that strains in the glass indicate that the glass is under tension or compression, and this condition, if present in excess, may give rise to minute cracks or fissures and eventually cause failure of the seal. The greater the difference in the respective thermal expansions of the glass and metal, the more necessary it becomes to reduce the amount of metal contained within the glass at the seal and for this reason, in the case of copper and similar metals, a fine taper on the metal is provided.

However, the possibility of being able to match the glass and metal from the standpoint of thermal expansion or of being able to keep the strains in the glass below the breaking strength of the glass in case the glass and metal thermal expansions do not match one another, is not sufficient when accomplished only at room temperature because the glass and metal must first of all be heated to a high temperature in order to make the seal. For this purpose, the glass is heated to a temperature above that at which it begins to soften or change its shape, in fact, the glass should be rendered plastic or fluid-like so that it may actually "wet" the metal and stick thereto. Such a temperature is in the neighborhood of 800° C. or higher, depending upon the composition of the glass, and is to be distinguished from the "softening" temperature which may be as low as 550° C. and which we define as being the temperature at which the glass becomes sufficiently yielding so that strains are relieved practically instantaneously, or within a very short period, for example, less than one minute. The seal is then allowed to cool directly to room temperature or, as is the more usual case, the cooling process is temporarily arrested at a predetermined elevated temperature, termed the "annealing" temperature, and after a definite period of time which allows the glass to come to equilibrium, the cooling of the seal is resumed. For the purpose of defining the characteristics of a particular glass we consider its technical "annealing" point to be the lowest temperature (below the "softening" temperature) at which 90 per cent of the strains in the glass will be removed in about 15 minutes.

During the heating and cooling cycles, the temperature of the seal which includes the glass and metal sections, is thus more or less gradually reduced from the softening temperature of the glass to room temperature. In the prior seals, the glass and metal members, even though they may have had substantially the same coefficients of expansion at room temperature, have had different thermal expansions at the different temperatures involved in the process of making the seals and these members have undergone individual expansions and contractions in size during the heating and cooling cycles. Consequently, such seals have involved strains introduced at the higher temperatures which were carried through to the lower temperatures. Even though these residual strains may not have been greater than the elastic limit or breaking strength of the glass, depending upon the amount and kind of metal employed, at the time the seal was made, there has always been the possibility that the seal might eventually fail due to aging of the glass and the reduction of its elastic limit over a period of time, and many failures may be attributed to this cause. In view of these considerations, it is evident that none of the seals of the prior art has been entirely free from strain over the whole temperature range between room temperature and the softening temperature of the glass.

Considerable restriction has been introduced into the design of electrical apparatus involving prior seals which employ metal and glass having different thermal expansions over the temperature range through which the seal passes during the heating and cooling cycles. This restriction of tube design has necessitated special positions of the seal with respect to the envelope, also special configurations of the seal, and necessarily represents a compromise in tube design between obtaining the maximum operating efficiency of the device on the one hand, and the practical limitations imposed by the seal on the other hand. As one example of a limitation imposed by conditions at the seal, mention may be made of tungsten wires when employed as leading-in conductors in borosilicate glass, in which case the diameter of the wires, and their current-carrying capacity have to be kept small, as is well known in the art.

The chief difficulty in making a satisfactory seal, i. e. one which is entirely free from strain throughout the entire range of temperature changes, appears to reside in the complexity of the thermal expansion curves (or thermal characteristics) of the glasses usually employed for seal purposes and the difficult problem of matching these curves in a practical manner with the thermal expansion curves of metals and alloys which are usually not so complex. The thermal expansion curves of the glasses ordinarily consist of approximately straight lines up to a temperature which may be conveniently termed the "critical temperature" or "transformation zone," from which temperature or zone the curves take an upward turn corresponding with a rapid increase in thermal expansion. This transformation zone occurs in every case below the annealing temperature of the glass and far below its softening point. This upward turn of the glass expansion characteristic has been explained as due to the glass not being in equilibrium and may be avoided so that the characteristic conforms to a straight line more or less, if sufficient time is allowed at each temperature rise for the glass to come to equilibrium. However, the time necessary for this purpose is extremely long and would be impractical in seal making.

Metals and alloys heretofore employed in the art of sealing, either exhibit no abrupt change in their thermal expansion curves, and have straight-line characteristics up to the softening temperature of the glass, or else have abrupt changes in slope before this temperature is reached, in which case the change in slope does not coincide either in position or degree of change with that of the glass to which it is joined. The result is that as the glass and metal cool down together from the glass-softening temperature and pass through any of the knees or bends in the glass and metal characteristic curves, the glass is subjected to a strain either of tension or compression due to the differences in their respective thermal expansions. Even though this strain is not sufficient to produce cracks or fissures at the time the seal is made, the glass is weakened at the joint and the seal is much more liable to failure, when the tube is operated at elevated temperatures, or even when it is idle and at room temperature. It is apparent that when an electric discharge tube of which the seal constitutes a part of the envelope is heated during operation, the temperature reached may be one of those temperatures at which there is a substantial difference in the respective thermal expansion coefficients of the glass and metal. This difference of expansion may serve to accentuate the residual strain or perhaps introduce additional strains.

An object of the present invention is to provide a hermetic seal between glass and metal which will be free from strain or very nearly so, not only at room temperatures but also at all elevated temperatures reached during the manufacture or operation of the tube, even up to the softening temperature of the glass.

Another object is to provide such a seal in which there are no limitations as to size or shape of the metal involved in the seal due to thermal expansion and will even include butt-joints of the largest practical dimensions and thicknesses of the metal and glass.

A still further object is to provide a hermetic seal which can be quickly or satisfactorily made out of relatively inexpensive metal and glasses, and which does not require expert workmanship in the manufacture of the seal.

In carrying out these objects, we have discovered that there are certain alloys or groups of alloys, the constituents of which when present in the proper amounts, provide complex expansion characteristics which closely match those of certain glasses to which they may be joined throughout the entire temperature range between the glass softening temperature and room temperature. By proper change in the percentages of the alloy metals and in the combination of metals, we are able to change the thermal expansion characteristic of the alloy in any desired and predetermined manner within certain limits, so as to accommodate all changes in the thermal expansion curves of a wide variety of glasses which may be used for making seals.

Figure 2:
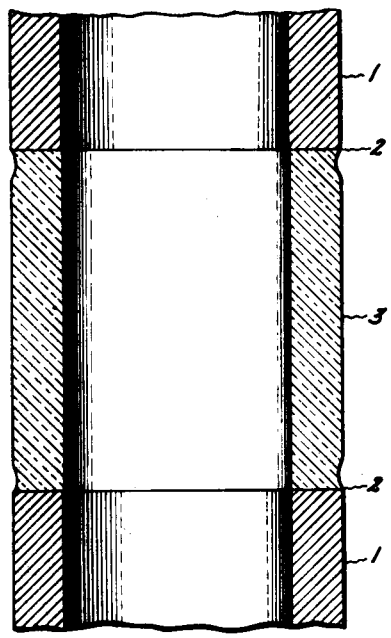
Figure 3:
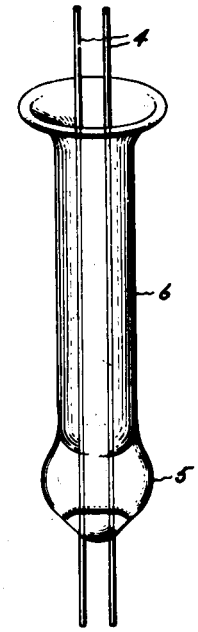

The invention will be better understood when reference is made to the following description and the accompanying drawing in which Fig. 1 represents a typical form of joint between glass and metal in which our invention finds utility; Fig. 2 is an enlarged cross-sectional view, partly broken away, of the structure shown in Fig. 1; Fig. 3 is an elevational view of another type of glass-to-metal seal which may be advantageously made in accordance with the present invention, and Fig. 4 shows two sets of curves selected from a larger number of curves, and designated (a) and (b), depicting the thermal linear expansion characteristics of some of the alloys and glasses used in our improved seals.

Figure 4:
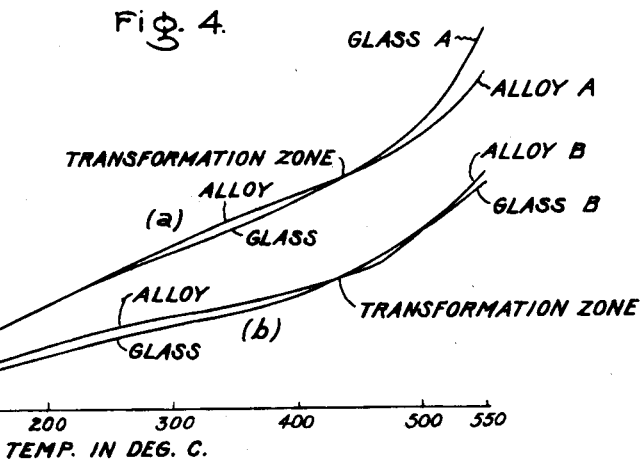

The curves shown in Fig. 4 have been plotted with change in length in centimeters per centimeter $\times 10^{-6}$ as ordinate, against change in temperature (degrees centigrade) to which the material is being subjected, as abscissa. These curves have been drawn from actual test data obtained in the most scientifically approved and accurate manner and represent only a few of the characteristics of the many glasses and alloys which may be employed in accordance with the present invention. In general, the set of curves "a" compares the coefficients of expansion between a typical relatively "soft" soda lime glass, the composition of which will be stated hereinafter, and an alloy which will also be described hereinafter, over a temperature range between 0° C. and approximately 550° C. The reason the curves go only to 550° C. is because the particular glasses exemplified are in this region approaching so close to the softening point that the degree of accuracy of the expansion measurements is seriously impaired by the yielding of the glass. The set of curves "b" compares the coefficients of expansion between a typical "hard" borosilicate glass and a suitable alloy, both compositions of which will be stated hereinafter, over the same temperature range. For convenience in specifically referring to the different curves, the glasses have been designated "Glass A" and "Glass B" respectively and the alloys to which each of the glasses is adapted to be sealed have been designated "Alloy A" and "Alloy B" respectively.

It will be noted that in both sets of curves, the thermal expansion characteristic of the metal almost exactly matches that of the glass. In the temperature regions which have been marked on the drawing as "transformation zones", which are regions where the alloy undergoes a marked change in its magnetic property, the expansion curve of the metal turns up at approximately the same rate and position as that of the glass, even as far as the softening temperature of glass. We consider the ideal case to be that in which the characteristics of the glass and metal coincide at all temperatures at, above and below the transformation zone, at least as high as the softening point of the glass. For practical purposes, however, a substantial coincidence is all that is required for the production of strain-free seals within the scope of the invention. As is shown at the extreme right-hand end of the curve group "a", some divergence may be permitted between the two characteristics in the region above the transformation zone, such divergence being of less consequence here than it would be at lower temperatures because of the increasingly yielding quality of the glass in this region. Accordingly, we have found that essentially strain-free seals are obtained if the thermal characteristics of the combined materials substantially coincide at temperatures at, below and appreciably above the transformation zone and continue along lines of generally similar curvature up to the softening point of the glass. Hence, if the alloy A were joined to glass A or the alloy B to glass B, the glass in both cases being heated to its plastic or wetting condition, the metal will stick to the glass during the entire cooling cycle, down to room temperature, and there will be no tendency for strains to be set up in the glass, particularly after the glass has become partially set or is otherwise in a condition such that it will not yield.

As far as applicants are aware, they are the first to have realized the importance of matching the thermal expansions of the glass and metal which are to be joined together, over the entire temperature range from room temperature up to and including the softening temperature of the glass, i. e. above, as well as below the transformation zone of the joined members. While many glasses and metals, alloys or composite forms of metal which have heretofore been used in the prior art for sealing purposes have had comparable coefficients of expansion at room temperature and above, this similarity has not extended as far as the transformation zone and beyond. A careful investigation of the thermal expansion properties of metals which have heretofore been used for sealing purposes, will show that all simple i. e. unalloyed metals, and many alloys have linear thermal expansion characteristics which extend in substantially straight lines from room temperature to well beyond 550° C. However, some alloys have characteristics which start out as straight lines, and then abruptly curve upward at various places, beginning at a point in the neighborhood of 150° C. to 200° C., the "transformation point" or zone, depending upon the kind of alloy. Alloys which have thermal expansion characteristics of this sort are those containing magnetic materials and include such alloys as nickel-iron, cobalt-iron, nickel-cobalt, cobalt-nickel-iron and cobalt-nickel-iron-chromium. In general, the "transformation point" on the temperature expansion curve marks a distinct change in the state of the alloy as regards its magnetic properties.

Comparing the characteristics of metals and alloys with those of the common glasses, it will be found that the thermal expansion characteristics of the glasses also start out as straight lines similar to those of the metals and alloys, but the slopes of the lines are, in general, different from those of the metal characteristics. Moreover, the glass characteristic does not extend as a straight line beyond a moderate temperature but instead, takes a sharp bend upward, at a temperature far below its softening point and in all cases below the annealing temperature. In view of this curvature of the glass characteristic, it is obviously impossible to seal to glass, without strain, any of the unalloyed metals, or those alloys which have approximately straight line characteristics up to temperatures beyond the transformation zone of the glass.

As for the alloys referred to hereinbefore which have thermal expansion characteristics which turn upward similar to glass, it is evident that the rate at which the glass characteristic changes, and the position of the transformation zone, may be quite different and generally is, from the change in slope of the alloy characteristic, or the position of its transformation point. Any wide departure of this kind between the characteristics of the glass and metal, either in slope or position of the transformation zone, necessarily introduces severe strains at the elevated temperatures. These strains are for a large part carried through the cooling cycle down to a point where the glass becomes set or partially hardened so that the strain remains in the seal even though the glass and metal have substantially the same coefficients of expansion at room temperature to which they are finally cooled.

However, as stated hereinbefore, the alloy employed in applicants' improved seal not only has substantially the same coefficient of expansion at room temperature as the glass to which it is joined, but also at all other temperatures up to and including the softening temperature of the glass. Consequently, it is impossible for any strain to be introduced into the glass at the high temperatures and there can be no strain residing in the seal when the glass and metal have cooled at a moderate rate to room temperature. The absence of strain in the glass brought about by the use of a special alloy and glass is so pronounced that the usual annealing treatment of the glass may, on occasion, be dispensed with, although as stated hereinbefore, it is still preferable to use this treatment in order to relieve the internal strains introduced into the glass solely by temperature gradients.

As for the specific compositions of suitable glasses and alloys which may be employed in accordance with the present invention, an example of a "soft glass" so-called may have the following composition: 67% silica ($SiO_2$), 1% boric oxide ($B_2O_3$), 15% sodium oxide ($Na_2O$), 7% calcium oxide (CaO), 6% zinc oxide (ZnO), and 4% aluminum oxide ($Al_2O_3$). A glass having this approximate composition may be advantageously sealed to an alloy which consists of 25% cobalt (Co), 30% nickel (Ni), 40% iron (Fe) and 5% chromium (Cr). The thermal expansion characteristic of this glass is that indicated by the legend "Glass A" in Fig. 4, while the characteristic of the specific alloy is that designated by the legend "Alloy A."

As an example of a "hard glass" so-called, a material having the approximate composition of 65% silica ($SiO_2$), 23% boric oxide ($B_2O_3$), 7% sodium oxide ($Na_2O$), and 5% aluminum oxide ($Al_2O_3$) may be advantageously sealed to an alloy having the composition of 18% cobalt (Co), 28% nickel (Ni), 54% iron (Fe). The thermal expansion characteristic of this glass is that shown in Fig. 4 designated "Glass B," while the characteristic of the alloy is that designated "Alloy B."

The compositions of the respective glasses and alloys are set forth simply by way of example as obviously, some of the elements in each glass and alloy may be present in different proportions from those stated and the elements themselves may be changed by substitution or otherwise. The glasses specifically set forth are to be considered simply as representing a typical range of glasses between the soft glass on the one hand and the hard glass on the other hand. As indicating to some extent the extreme manner in which the glasses and alloys may be modified, a "lead" glass so-called consisting of approximately 66% silica ($SiO_2$), 7.5% sodium oxide ($Na_2O$), 6.3% potassium oxide ($K_2O$) and 20.2% lead oxide (PbO) may be satisfactorily sealed in accordance with the present invention, to an alloy containing approximately 25% cobalt (Co), 30% nickel (Ni), 37% iron (Fe) and 8% chromium (Cr). Another example in which the thermal expansion characteristics of the glass and metal closely match one another above as well as below the transformation zone is a seal in which the glass consists of approximately 22.5% silica ($SiO_2$), 41.35% boric oxide ($B_2O_3$), 21.2% aluminum oxide ($Al_2O_3$), 9.4% calcium oxide (CaO), 4.8% sodium oxide ($Na_2O$), 0.7% potassium oxide ($K_2O$), 0.05% iron oxide ($Fe_2O_3$), and the alloy consists of approximately 15% cobalt (Co), 30% nickel (Ni), 50% iron (Fe), 5% chromium (Cr). In all of the alloys referred to hereinbefore, other elements may be added or substituted and the alloy may still have the same expansion thermal characteristic. As one example of such a change, manganese in suitable quantity may be substituted for chromium without changing a given thermal expansion characteristic. Small percentages of other metals might be added to the various alloys without materially changing their coefficients of expansion.

Thus in accordance with our invention, the composition of the glass may be modified, either as to composition or relative percentages of the elements involved, to suit the characteristics of one of the above-mentioned alloys. The alloys may also be modified either as to composition or relative percentages of the elements to suit the characteristics of one of the above-mentioned glasses, or the glasses and alloys may be mutually modified as to composition and percentage, to suit one another.

As stated hereinbefore, one of the features of the present invention is the discovery that for the fabrication of a strain-free seal, it is essential that the thermal expansion of the metal shall match that of the glass in a temperature range above the transformation zones of the joined members. Applicants have also discovered that there exist certain combinations of glasses and alloys which have closely matched thermal expansion characteristics over the entire temperature range, from 0° C. up to and including the softening temperature of the glass, i. e. above and below the transformation zone. Consequently, our invention is not limited to any particular glass or alloy but embraces all glasses and alloys which have thermal expansion characteristics of the type referred to.

As a direct result of the invention, it is possible to make seals between glasses and metals having all sorts of shapes and sizes, indeed, a seal of this kind may be made directly between butt edges regardless of the thickness of the members contacting at the joint. Thus in Figs. 1 and 2, there are joined two metal cylinders 1 which may be constituted of an alloy having the elements set forth as alloy A or alloy B, sealed by a butt joint, designated by the reference character 2, to an intermediate section of glass 3 which may have a composition set forth as glass A or glass B, depending upon the kind of alloy. Since there are no limitations as to the size of the glass and metal members which may be sealed together from the standpoint of their relative thermal expansions, no tapering of the metal is necessary, even in the case of large bodies of metal and glass. There is, therefore, no restriction as to tube design under these conditions and consequently, electrical apparatus of this sort may be designed with more attention paid to ideal electrical operating conditions than to mere mechanical or physical detail of the seal.

As shown in Fig. 3, the leading-in conductors 4 which may be constituted of any of the alloys set forth may be sealed without strain into a glass press 5 which terminates a reentrant stem 6 adapted to be secured to the envelope of an electric discharge device. For reasons stated hereinbefore, the leading-in conductors 4 have no limitations as to size considered from the standpoint of the relative thermal expansions of the glass and metal in order to provide a strainless seal. These conductors may be made quite large, in fact, much larger than those employed in the prior tubes so that considerably more current may be conducted from the exterior of a tube into the interior thereof. It is no longer necessary, in the case of a large conductor, to flatten or otherwise distort the configuration of the metal conductors in order that they may be sealed and consequently, less labor is involved in making the seal.

What we claim as new and desire to secure by Letters Patent of the United States, is:

1. An article comprising glass welded to an alloy formed of cobalt, nickel, iron and chromium, said alloy having a thermal expansion characteristic, the transformation zone of which substantially coincides with that of said glass and which substantially corresponds in value and slope with the characteristic of said glass at temperatures at, above, and below said transformation zone.

2. An article comprising glass containing approximately 65% silica, 23% boric oxide, 7% sodium oxide and 5% aluminum oxide welded to an alloy of approximately 18% cobalt, 28% nickel and 54% iron.

3. An article comprising glass consisting of approximately 67% silica, 1% boric oxide, 15% sodium oxide, 7% calcium oxide, 6% zinc oxide and 4% aluminum oxide welded to an alloy formed of approximately 25% cobalt, 30% nickel, 40% iron and 5% chromium.

4. An essentially strain-free seal comprising a glass in fused combination with a metal having a transformation zone below the annealing temperature of said glass, the thermal expansion characteristics of said glass and said metal being substantially coincident for all temperatures at, as well as above and below, said transformation zone, at least up to the softening temperature of the glass.

5. An essentially strain-free seal comprising a glass in fused combination with a metal having a transformation zone below the annealing temperature of said glass and having a thermal expansion characteristic which is substantially straight at temperatures below the transformation zone but curves upwardly at temperatures above the transformation zone, said glass having a transformation zone which substantially coincides with the transformation zone of the metal and a thermal characteristic the slope of which substantially matches the slope of the metal characteristic at all temperatures above and below the transformation zone, at least up to the softening temperature of the glass.

6. An essentially strain-free seal comprising glass welded to an alloy containing iron, nickel and cobalt, said alloy having a transformation zone which substantially coincides with that of said glass and a thermal expansion characteristic which substantially corresponds in value and slope with the characteristic of said glass at temperatures at, above, and below said transformation zone.

7. A strain-free seal comprising a glass in fused combination with a metal having a transformation zone below the annealing point of said glass, the thermal expansion characteristics of said glass and said metal being substantially coincident at temperatures at, below and appreciably above the transformation zone and continuing along lines of generally similar curvature up to the softening temperature of the glass.

8. An article comprising borosilicate glass welded to an alloy containing approximately 18 per cent cobalt, approximately 28 per cent nickel, and approximately 54 per cent iron, said glass having a transformation zone which is substantially coincident with that of the alloy, and a thermal expansion characteristic which substantially matches that of the alloy at temperatures at, below and appreciably above the transformation zone at least up to the softening point of the glass.

EMMETT E. BURGER.
ALBERT W. HULL.